US010791130B2

(12) United States Patent
Uggirala

(10) Patent No.: US 10,791,130 B2
(45) Date of Patent: Sep. 29, 2020

(54) TRIGGER-BASED HARVESTING OF DATA ASSOCIATED WITH MALIGNANT CONTENT IN A NETWORKED ENVIRONMENT

(71) Applicant: OpSec Online Limited, Washington (GB)

(72) Inventor: Ananth Uggirala, Mountain View, CA (US)

(73) Assignee: OpSec Online Limited, Washington (UA)

( * ) Notice: Subject to any disclaimer, the term of this patent is extended or adjusted under 35 U.S.C. 154(b) by 51 days.

(21) Appl. No.: 15/278,888

(22) Filed: Sep. 28, 2016

(65) Prior Publication Data
US 2018/0091537 A1 Mar. 29, 2018

(51) Int. Cl.
*G06F 21/00* (2013.01)
*H04L 29/06* (2006.01)
*G06F 16/951* (2019.01)
*G06F 21/55* (2013.01)
*G06F 21/56* (2013.01)
*G06F 16/955* (2019.01)

(52) U.S. Cl.
CPC ........ *H04L 63/1425* (2013.01); *G06F 16/951* (2019.01); *G06F 16/9566* (2019.01); *G06F 21/554* (2013.01); *G06F 21/563* (2013.01); *H04L 63/1441* (2013.01)

(58) Field of Classification Search
CPC ............. H04L 63/1425; H04L 63/1441; G06F 17/30887; G06F 21/563; G06F 17/30864; G06F 21/554; G06F 16/9566; G06F 16/951
See application file for complete search history.

(56) References Cited

U.S. PATENT DOCUMENTS

| 8,707,441 B1* | 4/2014 | Cidambi | H04L 63/145 705/51 |
| 9,547,693 B1* | 1/2017 | Sheasby | G06F 16/24566 |
| 2005/0039082 A1* | 2/2005 | Nachenberg | G06F 21/56 714/38.13 |
| 2007/0214097 A1* | 9/2007 | Parsons | G06Q 30/0264 706/12 |

(Continued)

OTHER PUBLICATIONS

Extended European Search Report from related European patent application No. 17193801.2 dated Feb. 13, 2018.

*Primary Examiner* — Kendall Dolly
(74) *Attorney, Agent, or Firm* — McCarter & English, LLP

(57) ABSTRACT

Exemplary embodiments of the present disclosure relate to systems, methods, and non-transitory computer-readable media for searching content in a networked environment to identify malignant content and ultimately for removing the malignant content from the networked environment. Content hosted by one or more servers in a networked environment can initially be searched based on one or more search terms, and attributes from each result in a first set of results returned in response to searching the content hosted by the one or more servers can be extracted. Each result can be tagged based on the attributes, and at least one supplement search of the content hosted by the one or more servers in the networked environment can be triggered in response to at least one of the results being tagged as malignant content.

20 Claims, 11 Drawing Sheets

(56) References Cited

U.S. PATENT DOCUMENTS

| | | | |
|---|---|---|---|
| 2009/0089296 A1* | 4/2009 | Stemeseder | G06F 16/951 |
| 2009/0150365 A1* | 6/2009 | Chow | G06F 17/30867 |
| 2009/0287653 A1* | 11/2009 | Bennett | G06F 16/951 |
| 2015/0200963 A1* | 7/2015 | Geng | G06F 21/51 |
| | | | 726/22 |
| 2016/0085826 A1* | 3/2016 | Chadha | G06F 17/30867 |
| | | | 707/765 |

* cited by examiner

TRIGGER-BASED HARVESTING OF DATA ASSOCIATED WITH MALIGNANT CONTENT IN A NETWORKED ENVIRONMENT

BACKGROUND

An overwhelming amount of digital content is available over networked environments, such as the Internet. This digital content is spread across multiple data channels and/or sources, and more and more content is being made available daily. While most of this content is credible, legitimate, or innocuous (collectively referred to herein as "benign content"), some content is infringing, fraudulent, counterfeit, malicious (e.g., including malware, viruses, etc.), or worse (collectively referred to herein as "malignant content"). In many instances, such malignant content is generated so that it appears to the lay user to be benign content. As one example, malignant content can be generated to replicate benign content and/or can have other hallmarks commonly associated with benign content. As another example, malignant content can be incorporated into or can otherwise originate from a data channel or source that is commonly associated with benign content (e.g., where the data channel or source allows third parties to add content to the data channel or source). Often identifying, tracking, and remedying malignant content in networked environments, such as the Internet, is a moving target given the fluidity with which content can be added or removed from one or more Internet data channels or sources. Additionally, data structures and the arrangement of content on the Internet can make it difficult to efficiently and effectively search for and find malignant content.

SUMMARY

Exemplary embodiments of the present disclosure advantageously address problems associated with inefficient and resource intensive detection and tracking malignant content on the Internet or other networked environments. For example, exemplary systems, methods, and computer-readable media are described herein that perform multi-step searching of content in networked environments to identify areas that include suspicious content and then to effectively and efficiently target those areas.

Exemplary embodiments of the present disclosure can advantageously provide for brand protection in networked environments by providing the ability to harvest content from data sources in the networked environments based on search terms (e.g., keywords), where a harvesting engine initially perform a coarse search for content in the networked environment based on the search terms, and an extraction engine extracts data from the content returned by the coarse search. The extracted data can be analyzed to determine whether the harvesting engine found any malignant content based on the initial coarse search. When malignant content is detected, exemplary embodiments of the present disclosure can be triggered to create one or more micro-harvests that target specific content from one or more data sources associated with the malignant content to identify and/or detect additional malignant content; rather than repeatedly targeting the entire networked environment (e.g., the Internet) using generic search terms (an inefficient and resource intensive process). As result, server performance of the system is improved, less computing resources are required, and time savings are realized.

In accordance with embodiments of the present disclosure, a method for searching content in a networked environment to identify malignant content is disclosed. The method includes searching content hosted by one or more servers in a networked environment based on one or more search terms; extracting attributes from each result in a first set of results returned in response to searching the content hosted by the one or more servers; tagging each result based on the attributes; and triggering a supplement search of the content hosted by the one or more servers in the networked environment in response to at least one of the results being tagged as malignant content. A non-transitory computer-readable medium is also disclosed that includes instructions that are executable by one or more processors, wherein execution of the instructions by the one or more processors causes the one or more processors to implement the method for searching content in a networked environment to identify malignant content.

In accordance with embodiments of the present embodiment, a system for searching content in a networked environment to identify malignant content is disclosed. The system includes a computing system that is communicatively coupled to data sources in a networked environment, and includes one or more local servers being disposed in the computing system. The data sources include one or more remote servers that are configured to host content. The one or more local servers are programmed to search content hosted by one or more remote servers in the networked environment based on one or more search terms; extract attributes from each result in a first set of results returned in response to searching the content hosted by the one or more remote servers; tag each result based on the extracted attributes; and trigger a supplement search of the content hosted by the one or more remote servers in the networked environment in response to at least one of the results being tagged as malignant content.

In accordance with embodiments of the present disclosure, one or more queries can be generated based on the one or more search terms (e.g., by the one or more local servers). The one or more queries can form an input to at least one of a search engine or an application program interface for searching content hosted by the one or more servers.

In accordance with embodiments of the present disclosure, attributes from each supplement result in a second set of results returned in response to the supplemental search of the content hosted by the one or more remote servers can be extracted (e.g., by the one or more local servers), and each supplemental result can be tagged (e.g., by the one or more local servers) based on the attributes extracted from the supplemental results.

In accordance with embodiments of the present disclosure, records in a database for the first set of results can be created (e.g., by the one or more local servers) in response to extracting the attributes from each result in the first set of results. Each one of the records created in the database for the first set of results can correspond to one of the results in the first set. The attributes extracted from each result can be stored (e.g., by the one or more servers) in a corresponding one of the records created in the database.

In accordance with embodiments of the present disclosure, attributes from each supplement result in a second set of results returned in response to the supplemental search of the content hosted by the one or more remote servers can be extracted (e.g., by the one or more local servers), records can be created in the database for the second set of results (e.g., by the one or more local servers) in response to extracting the attributes from each supplemental result in the second set of results. Each one of the records created in the database for the supplemental search can correspond to one of the supplemental results in the second set. The attributes extracted from each supplemental result can be stored (e.g., by the one or more local servers) in a corresponding one of the of records created in the database for the supplemental results. Each supplemental result can be tagged (e.g., by the one or more local servers) based on the attributes extracted from the second set of results, and further supplement searches of the content hosted by the one or more remote servers can be triggered (e.g., by the one or more local servers) in the networked environment in response to at least one of the supplemental results being tagged as malignant content.

In accordance with embodiments of the present disclosure, one or more uniform resource locators can be generated (e.g., by the one or more local servers) based on at least one of the attributes included in the at least one of the results in the first or second set of results being been tagged as malignant content. The supplemental searches can based on the uniform resource locator(s).

In accordance with embodiments of the present disclosure, the one or more remote servers in the networked environment are webservers, the content hosted by the one or more servers is websites including webpages, and at least one of the websites utilizes a tree or catalogue model in which at least some of the webpages are incapable of being found based on searches using search terms (e.g., key words).

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

In the drawings, like reference numerals refer to like parts throughout the various views of the non-limiting and non-exhaustive embodiments.

DETAILED DESCRIPTION

Exemplary embodiments of the present disclosure relate to systems, methods, and non-transitory computer-readable media for searching content in a networked environment to identify malignant content and ultimately for removing the malignant content from the networked environment.

In one example application, exemplary embodiments of the present disclosure can be implemented for brand protection in networked environments. Exemplary embodiments of the present disclosure provide the ability to coarsely harvest content from data sources in a networked environment, e.g., where a harvesting engine searches for content in the data sources based on search terms (e.g., keywords), and an extraction engine extracts attributes from the content. The attributes can be displayed to a user in or more graphical user interfaces. The extracted attributes can be used to identify and/or determine whether there suspicious content found by the harvesting engine (e.g., malignant content).

When suspicious content is detected, exemplary embodiments of the present disclosure can create one or more micro-harvests based on the suspicious content, which can be used for precise and tailored searching of additional content from the one or more data sources to identify and/or detect the extent/scope of the suspicious content. One example of suspicious content can include a webpage offering to sell products that are counterfeit or including infringing items. In exemplary embodiments, users can have control over the implementation and parameters of the one of more micro-harvests and/or micro-harvests can be autonomously configured and implemented. In one example, when a user finds malignant content (e.g., a webpage offering a counterfeit product), a micro-harvest can be triggered to find and retrieve related content (e.g., related webpages including other offers from other sellers and/or other listings from the seller).

Micro-harvesters can run automatically as a background process in a computing system and/or can perform scans based on user-actions. Thus, rather than repeatedly targeting the entire networked environment (e.g., the entire Internet) using generic search terms (an inefficient and resource intensive process), exemplary embodiments of the present disclosure can focus on those areas in the networked environment that have been identified as including suspicious content (e.g., based on an initial harvest). As result, server/system performance is improved and time savings are realized. In this regard, exemplary embodiments of the present disclosure, provide for an efficient and effective tool for harvesting a growing number of online marketplaces and webpages that are adopting a catalog-model to group related products, sellers and SKUs, where most listings include benign content (e.g., approximately 95% of the content is benign) and only a small portion of the listings are malignant (e.g., approximately 5%).

Figure 1:
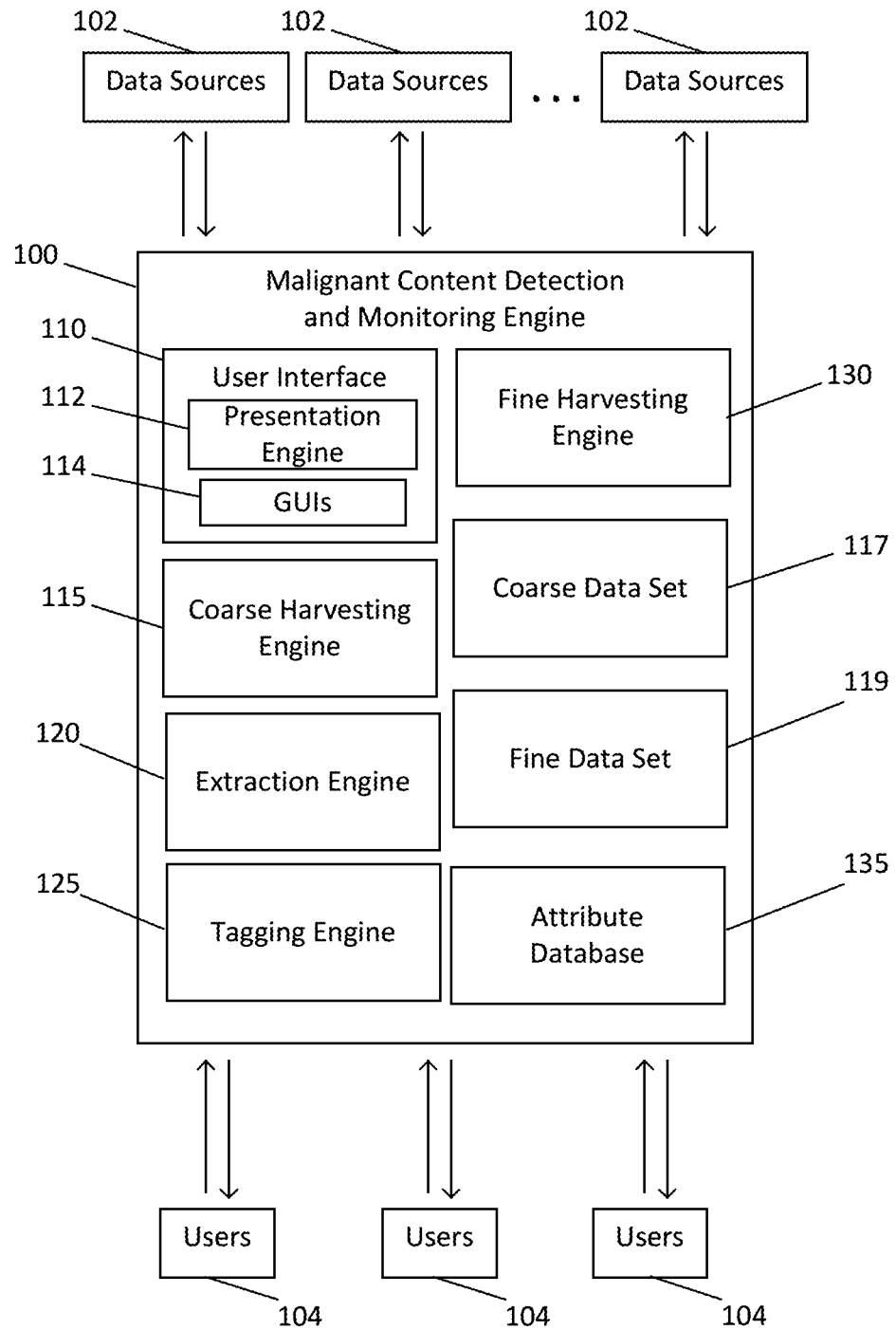
FIG. 1 is a block diagram of an exemplary malignant content detection and monitoring engine for identifying, tracking, assessing, and facilitating the remediation of malignant content from disparate data sources associated with various data channels in a networked environment in accordance with embodiments of the present disclosure.

FIG. 1 is a block diagram of an exemplary malignant content detection and monitoring engine 100 for identifying, tracking, assessing, and facilitating the remediation of malignant content from disparate data sources 102 associated with various data channels on the Internet or in any other networked environment in accordance with embodiments of the present disclosure. The engine 100 can include a user interface 110, a coarse harvesting engine 115, an extraction engine 120, a tagging engine 125, and a fine or micro-harvesting engine 130.

The user interface 110 can include a presentation/visualization engine 112 and one or more graphical user interfaces (GUIs) 114. The presentation engine 112 can be configured to provide an interface between one or more services and/or engines implemented in the engine 100. Upon receipt of data, the presentation engine 112 can be executed to generate the one or more of the graphical user interfaces 114 and to render the data in the one or more graphical user interfaces 114. The one or more graphical user interfaces 114 can allow users 104 to interact with the engine 100 and can include data output areas to display information to the users 104 as well as data entry fields to receive information from the users 104. Some examples of data output areas can include, but are not limited to text, graphics (e.g., graphs, maps—geographic or otherwise, images, and the like), and/or any other suitable data output areas. Some examples of data entry fields can include, but are not limited to text boxes, check boxes, buttons, dropdown menus, and/or any other suitable data entry fields.

The coarse harvesting engine 115 can be configured to crawl the web and/or the dark web, harvest search engines and/or APIs to search webpages (including marketplace webpages), collect social media feeds, potential phishing emails and landing pages, mobile application data, paid search advertisement or piracy event, and/or any other content in a networked environment. The coarse harvesting engine 115 can generate or build one or more queries (e.g., database, API or web-based queries) based on the one or more search terms (e.g., key words) input by one or more users 104 via the one or more graphical user interfaces 114. As one example, the coarse harvesting engine 115 can build several queries from a single set of search terms, where each query can be specific to a search engine and/or application program interface (API). The coarse harvesting engine 115 can execute each query with search engines and/or APIs, which can return Internet content and/or any other content in a networked environment. As one example, execution of the coarse harvesting engine 115 can return one or more webpages from one or more Internet domains hosted by one or more web servers at one or more data sources. In some embodiments, the search results can be returned as a list and the coarse harvesting engine 115 can limit the quantity of results to be processed by the engine 100. As a non-limiting example, the coarse harvesting engine 115 can select, e.g., the first one hundred webpages listed in the search results (or the first ten pages of search results) or any suitable quantity of results. The quantity of results selected for processing by the engine 100 can be specified by the engine 100 and/or by a user 104 of the engine 100.

The results returned via the coarse harvesting engine 115 can be stored (e.g., as a coarse data set 117). For example, each result (e.g., each webpage) can be stored as a file or other data structure. In some instances, one or more of the results can be stored in the same format in which it is on the data source from which it is retrieved. In some instances, one or more of the results can be stored in a different format than the format in which it is stored on the data source from which it is retrieved.

At least one of the webpages returned via the coarse harvesting engine 115 can come from a website that utilizes a tree or catalogue model. For example, the coarse search can search webpages of one or more marketplace websites based on the search terms. The webpages on the marketplace website can include listings of good/services available for purchase. Often such marketplace websites allow multiple third party sellers to sell the same good or service giving the buyer the ability to choose from which seller to buy the good or service. In such instances, some marketplace websites may include a separate webpage for each good/service (e.g., product) being offered for sale by each seller, while other marketplace websites can utilize the tree or catalogue model.

Using the tree or catalogue model, connections grow deeper as one navigates into a listing of a particular good or service on a marketplace website. Everything related is typically grouped under a listing: different stock keeping units (SKUs) of the same item, multiple sellers selling same item, "used" vs "new", seller reviews, related items, etc. The tree or catalogue model essentially provides for many offers/seller details/network connections happening under a single listing. For example, a first webpage (e.g., a product page) is created for one variation of the good or service including pictures and other attributes about the good or service (e.g., descriptions, specifications, dimensions, etc.) and a second webpage is created to identify each seller that is offering the good or service. In some instances, the first webpage can identify one of the sellers as a default and can include link(s) to other variations of the good or service (e.g., different colors, sizes, models, etc. of the good or service) and link(s) to the second webpage which can identify all of the sellers of the good or service.

In generally, each variation of the good or service receives a SKU from the manufacturer and/or receives a universal product code (UPC) by which it can be identified. As one example, a webpage for a shirt being sold can be available in different sizes (small, medium, and large) and different colors (red, white, and blue) and a different SKU and/or UPC can be used for each size-color pair (e.g., small and red variation of the shirt would receive its own SKU). Thus, rather than having a separate webpage for each SKU or UPC for each seller, the online marketplace can aggregate the SKUs or UPCs and sellers into fewer webpages. Under the tree or catalogue structure, as the number of SKUs, UPCs, and/or sellers increases, the online marketplace may not have to add and/or index additional webpages, it simply may add the seller information to an existing webpage for a particular variation of a good or service—making the process of adding and deleting content from the website easier and more efficient.

In some instances, a market place website can assign each SKU or UPC available on the marketplace a separate unique marketplace specific identifier, which can be used by the marketplace website to uniquely identify a product on the marketplace website in place of a SKU or UPC. The marketplace websites can incorporate these marketplace specific identifiers into their webpages and/or uniform resource locators (URL).

One non-limiting example of an online marketplace that utilize a tree or catalogue model is amazon.com from Amazon, where a product page (e.g., a webpage for a particular product sold on the Amazon marketplace) can identify numerous other sellers of the same product and/or can provide a link to a list of sellers selling the same product. In this example, each seller does not receive their own product page. Rather, the product page identifies a default seller, and to view other sellers of the product, a user must selected one or more links to a list of other sellers (e.g., a "new" link for sellers that sell the product as new, a "used" link for the sellers that sell the product as used, a "refurbished" link for the sellers that sell the product as refurbished).

While a particular variation of a good or service can typically be searched on such an online marketplace to return a default (first) webpage, e.g., the product page, for the particular variation of the good or service, the (second) webpage including the list of sellers selling the particular variation of the good or service is typically not indexed and generally cannot be searched by search engines or APIs using search terms. Furthermore, even if all of this data is searchable via a search engine or API, attempting to retrieve all of this information for each search hit across multiple marketplaces and other data channels on the Internet can be an inefficient, resource intensive process. Thus, the coarse harvesting engine 115 is configured to coarsely search for and identify webpages for websites that use a tree or catalogue model using search terms (e.g., key words). For example, the coarse harvesting engine 115 can be configured to search for webpage(s) in an online marketplace that include the search terms (e.g., a webpage or product page created for one variation of a good or service including pictures and other attributes about the good or service).

The coarse harvesting engine 115 can be programmed to facilitate parallel searching of various data sources for like content. The queries can be generated or built using one or more query languages, such as Structured Query Language (SQL), Contextual Query Language (CQL), proprietary query languages, domain specific query languages and/or any other suitable query languages. In some embodiments, the coarse harvesting engine 115 can generate or build one or more queries using one or more programming languages or scripts, such as Java, C, C++, Perl, Ruby, and the like.

The extraction engine 120 can parse the coarse data set 117 and extract attributes from each result (e.g., webpage) in the coarse data set 117. As the extraction engine 120 extracts the attributes from each result, the extraction engine 120 builds a database (e.g., a relational or NoSQL database) of the attributes. For example, a record can be created for each result (e.g., each webpage) in the coarse data set 117, and each attribute extracted from a result can correspond to fields of the record. The attributes extracted from the results to create the records can include information that may be useful in assessing whether each result corresponds to benign or malignant content. The attributes extracted from the results and stored fields of the database can be, for example: text such as a product name, a product description, a seller name, a geographic location of a seller, a geographic location to which a seller ships a product, seller reviews, and/or a title of the result (e.g., a title of the webpage); numbers such as a price, a quantity of a product available for purchase, and/or a marketplace-specific identifier; images, such as product images, logos, and/or artwork; other media, such as video and/or audio; a registrant name of the domain for a webpage; a name server that hosts the webpage; and raw data such as a HTML page source code, XML files, JavaScripts, and the like.

To extract the attributes from the results in the coarse data set 117, the extraction engine 120 can use, for example, natural language processing, machine learning, similarity measures, image matching techniques, and/or pattern matching techniques to identify attributes in the results. The extraction engine 120 can utilize one or more ontologies of entities to derive and/or identify entities (e.g., sellers) included in the results. Various algorithms and/or techniques can be utilized by the extraction engine 120. For example, algorithms for fuzzy text pattern matching, such as Baeza-Yates-Gonnet can be used for single strings and fuzzy Aho-Corasick can be used multiple string matching; algorithms for supervised or unsupervised document classification techniques can be employed after transforming the text documents into numeric vectors: using multiple string fuzzy text pattern matching algorithms such as fuzzy Aho-Corasick; and using topic models such as Latent Dirichlet Allocation (LDA) and Hierarchical Dirichlet Processes (HDP).

As a non-limiting example, a product page from a marketplace website implementing a tree or catalogue structure can be included in the coarse data set 117 and can be tagged as malignant content because the product page is selling counterfeit goods. In response to tagging this product page as malignant content, the fine harvesting engine 130 can be triggered to perform a supplemental search to identify one or more webpages that are related to the product page. For example, the fine harvesting engine 130 can identify a listing page identifying each seller offering the product on the product page.

Once the attributes of the coarse data set 117 have been extracted by the extraction engine and stored in a attribute database 135, the tagging engine 125 can be used to tag the coarse data set 117, e.g., via the attribute database 135. For example, the tagging engine 125 can be used to add a tag to a field of each record in the attribute database 135 to identify the records, and therefore, the results (e.g., webpages) in the coarse data set 117 associated with the records, as being benign or malignant (e.g., infringing, counterfeit, malicious). In some embodiments, users 104 can interact with the tagging engine 125 via the one or more graphical user interfaces 114 to allow the user 104 to specify tags for the records in the attribute database 135. In some embodiments, the tagging engine 125 can be configured to automatically tag the records of the attribute database 135. For example, the tagging engine 125 can be configured to utilize one or more machine learning algorithms to specify tags for the records in the attribute database 135, where the machine learning algorithm can be trained using a corpus of training data.

The fine or micro-harvesting engine 130 can be triggered in response to the tagging of the records in the attribute database 135 to perform precise harvesting of Internet content that is related to the webpages in the coarse data set 117 that have been identified as being malignant content (e.g., based on the tagging of the records in the attribute database 135). For example, in response to tagging a webpage in the coarse data set as being malignant content (e.g., infringing, counterfeit, malicious, etc.), exemplary embodiments of the fine harvesting engine 130 can determine whether the webpage that has been tagged as including malignant content was harvested from a website that utilizes a tree or catalogue structure for its webpages. If so, the fine harvesting engine 130 can be configured to automatically generate one or more structured URLs targeting the additional webpage(s) corresponding to the webpage that has been tagged as including malignant content and can retrieve the additional webpage(s) (e.g., results) to be processed by the extraction engine 120 to extract attributes from the additional webpage(s) as described herein. The structure URLs can include one or more attributes associated with the malignant content (e.g., a marketplace specific identifier) and can be formed to target specific webpages within a website (which may be incapable of being found by searches that use search terms). Thus, unlike the coarse harvesting engine 115, which generally utilizes search terms, the fine harvesting engine 130 target specific additional webpages as a supplemental search based on the structure of the website from which the webpage that has been tagged as being malignant was harvesting during the coarse search.

The additional webpage(s) returned via the fine harvesting engine 130 can be stored (e.g., as a fine or micro-data set 119). For example, each additional result (e.g., webpage) can be stored as a file or other data structure. In some instances, one or more of the additional webpages can be stored in the same format in which it is on the data source from which it is retrieved. In some instances, one or more of the additional webpages can be stored in a different format than the format in which they are stored on the data source(s) from which they are retrieved.

After one or more additional webpages are harvested by the fine harvesting engine 130, the attributes of the one or more additional webpages can be extracted by the extraction engine 120 in the same manner as the attributes associated with the coarse data set 117. The extraction engine 120 can add records and associated attributes to the attribute database 135. For example, a record can be created for each result (e.g., each webpage) in the fine data set 119, and each attribute extracted from a result can correspond to fields of the record. The attributes extracted from the results to create the records can include information that may be useful in assessing whether each result corresponds to benign or malignant content. The attributes extracted from the results and stored fields of the database can be, for example: text such as a product name, a product description, a seller name, a geographic location of a seller, a geographic location to which a seller ships a product, seller reviews, and/or a title of the result (e.g., a title of the webpage); numbers such as a price, a quantity of a product available for purchase, and/or a marketplace-specific identifier; images, such as product images, logos, and/or artwork; other media, such as video and/or audio; a registrant name of the domain for a webpage; a name server that hosts the webpage; and raw data such as a HTML page source code, XML files, JavaScripts, and the like.

Once the attributes of the fine data set 119 have been extracted by the extraction engine 120 and stored in the attribute database 135, the tagging engine 125 can be used to tag the fine data set 119, e.g., via the attribute database 135. For example, the tagging engine 125 can be used to add a tag to a field of each record associated with the fine data set 119 in the attribute database 135 to identify the records, and therefore, the results (e.g., webpages) in the fine data set 119 associated with the records, as being benign or malignant (e.g., infringing, counterfeit, malicious). In some embodiments, users 104 can interact with the tagging engine 125 via the one or more graphical user interfaces 114 to allow the user 104 to specify tags for the records in the attribute database 135. In some embodiments, the tagging engine 125 can be configured to automatically tag the records of the attribute database 135. For example, the tagging engine 125 can be configured to utilize one or more machine learning algorithms to specify tags for the records in the attribute database 135, where the machine learning algorithm can be trained using a corpus of training data.

In an exemplary embodiments, the user interface 110 can generate the one or more graphical user interfaces 114 to include a list of the records from the coarse and fine/micro searches, e.g., using views of the attribute database 135, where the records can be grouped in the one or more graphical user interfaces based on one or more of the attributes extracted from the coarse and fine data sets 117 and 119. As one non-limiting example, a record associated with the coarse data set 117 that has been tagged as malignant content can have related records that were harvested via the fine harvesting engine 130. These records can be grouped together in the one or more graphical user interfaces, e.g., based on their relationship. For example, each of these records can have an identical marketplace specific identifier in their extracted attributes.

Figure 2:
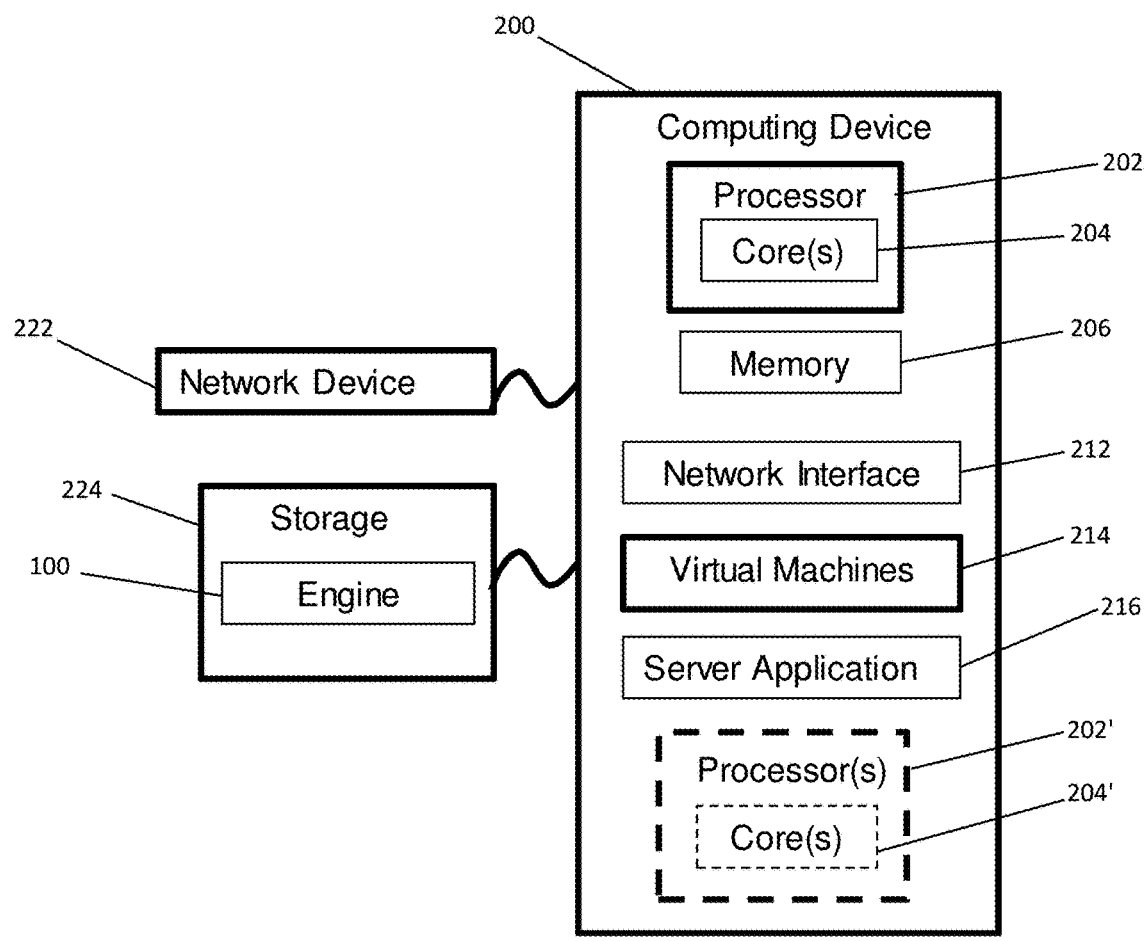
FIG. 2 is a block diagram of an exemplary computing device in accordance with embodiments of the present disclosure.

FIG. 2 is a block diagram of an exemplary computing device in accordance with embodiments of the present disclosure. In the present embodiment, the computing device 200 is configured as a server that is programmed and/or configured to execute one of more of the operations and/or functions of the engine 100 and to facilitate detection and monitoring of malignant content on the Internet or other networked environments. The computing device 200 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 206 included in the computing device 200 may store computer-readable and computer-executable instructions or software for implementing exemplary embodiments of the engine 100 or portions thereof.

The computing device 200 also includes configurable and/or programmable processor 202 and associated core 204, and optionally, one or more additional configurable and/or programmable processor(s) 202' and associated core (s) 204' (for example, in the case of computer systems having multiple processors/cores), for executing computer-readable and computer-executable instructions or software stored in the memory 206 and other programs for controlling system hardware. Processor 202 and processor(s) 202' may each be a single core processor or multiple core (204 and 204') processor.

Virtualization may be employed in the computing device 200 so that infrastructure and resources in the computing device may be shared dynamically. One or more virtual machines 214 may be provided to handle a process running on multiple processors so that the process appears to be using only one computing resource rather than multiple computing resources, and/or to allocate computing resources to perform functions and operations associated with the engine 100. Multiple virtual machines may also be used with one processor or can be distributed across several processors.

Memory 206 may include a computer system memory or random access memory, such as DRAM, SRAM, EDO RAM, and the like. Memory 206 may include other types of memory as well, or combinations thereof.

The computing device 200 may also include one or more storage devices 224, such as a hard-drive, CD-ROM, mass storage flash drive, or other computer readable media, for storing data and computer-readable instructions and/or software that can be executed by the processing device 202 to implement exemplary embodiments of the engine 100 described herein.

The computing device 200 can include a network interface 212 configured to interface via one or more network devices 222 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (including via cellular base stations), controller area network (CAN), or some combination of any or all of the above. The network interface 212 may include a built-in network adapter, network interface card, PCMCIA network card, card bus network adapter, wireless network adapter, USB network adapter, modem or any other device suitable for interfacing the computing device 200 to any type of network capable of communication and performing the operations described herein. While the computing device 200 depicted in FIG. 2 is implemented as a server, exemplary embodiments of the computing device 200 can be any computer system, such as a workstation, desktop computer or other form of computing or telecommunications device that is capable of communication with other devices either by wireless communication or wired communication and that has sufficient processor power and memory capacity to perform the operations described herein.

The computing device 200 may run any server application 216, such as any of the versions of server applications including any Unix-based server applications, Linux-based server application, any proprietary server applications, or any other server applications capable of running on the computing device 200 and performing the operations described herein. An example of a server application that can run on the computing device includes the Apache server application.

Figure 3:
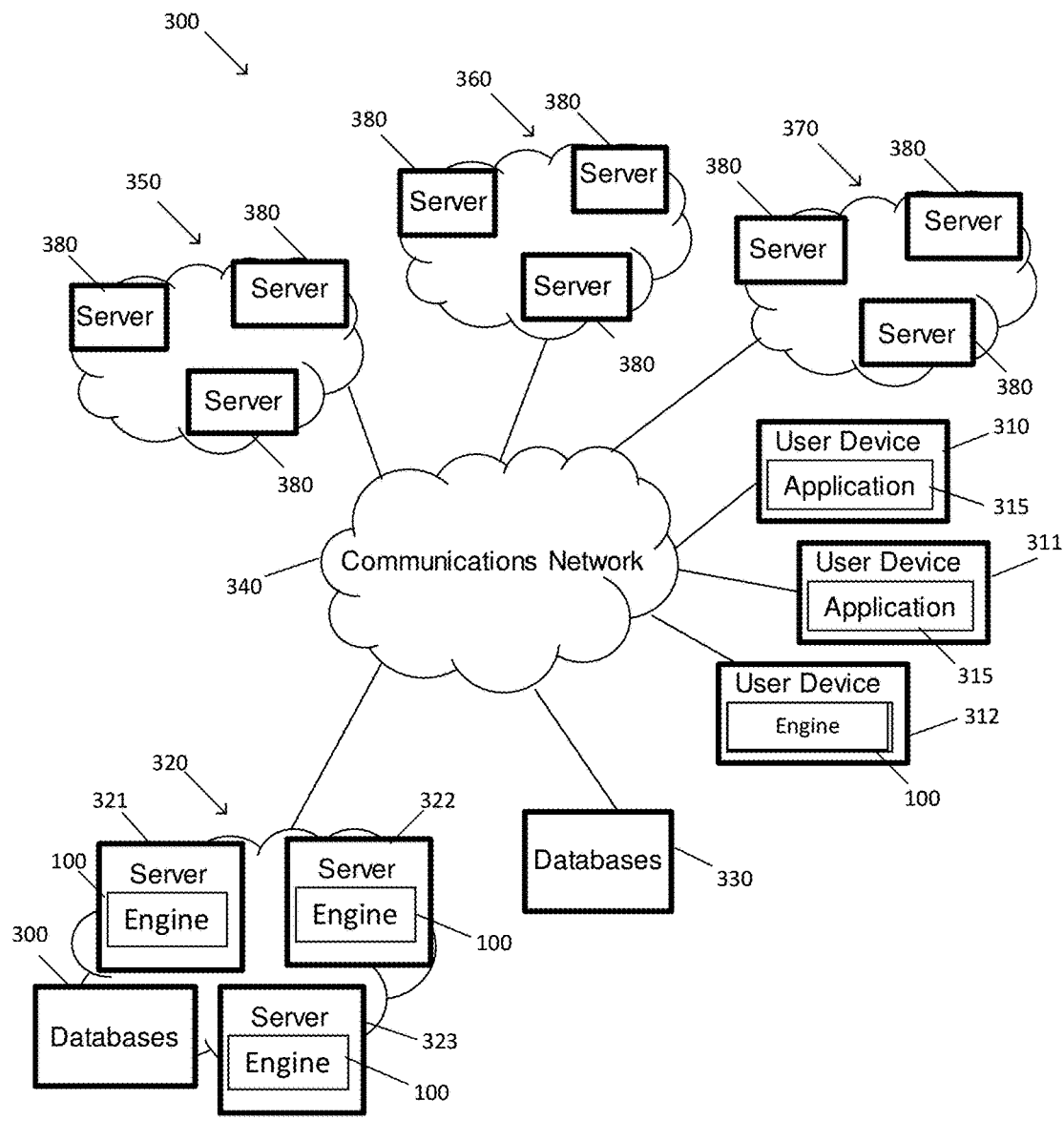
FIG. 3 is an exemplary networked environment for facilitating detection and monitoring of malignant content on the Internet in accordance with embodiments of the present disclosure.

FIG. 3 is an exemplary networked environment 300 for facilitating detection and monitoring of malignant content on the Internet or other networked environments in accordance with embodiments of the present disclosure. The environment 300 includes user computing devices 310-312 operatively coupled to a remote computing system 320 including one or more (local) servers 321-323, via a communication network 340, which can be any network over which information can be transmitted between devices communicatively coupled to the network. For example, the communication network 340 can be the Internet, an Intranet, virtual private network (VPN), wide area network (WAN), local area network (LAN), and the like. The environment 300 can include repositories or databases 330, which can be operatively coupled to the servers 321-323, as well as to the user computing devices 310-312, via the communications network 340. Those skilled in the art will recognize that the database 330 can be incorporated into one or more of the servers 321-323 such that one or more of the servers can include databases. In an exemplary embodiment, embodiments of the engine 100 can be implemented, independently or collectively, by one or more of the servers 321-323, can be implemented one or more of the user computing devices (e.g., the user computing device 312), and/or can be distributed between the servers 321-323 and the user computing devices.

The user computing device 310-312 can be operated by users to facilitate interaction with the engine 100 implemented by one or more of the servers 321-323. In exemplary embodiments, the user computing devices (e.g., user computing device 310-311) can include a client side application 315 programmed and/or configured to interact with one or more of the servers 321-323. In one embodiment, the client-side application 315 implemented by the user computing devices 310-311 can be a web-browser capable of navigating to one or more web pages hosting GUIs of the engine 100. In some embodiments, the client-side application 315 implemented by one or more of the user computing devices 310-311 can be an application specific to the engine 100 to permit interaction with the engine 100 implemented by the one or more servers (e.g., an application that provides user interfaces for interacting with the servers 321, 322, and/or 323).

The one or more servers 321-323 (and/or the user computing device 312) can execute the engine 100 to search for content available over the communications network 340. For example, the coarse and fine harvesting engines of the engine 100 can be programmed to facilitate searching data sources 350, 360, and 370, which each can includes one or more (remote) servers 380 that are programmed to host content and make the content available over the communications network 340. As a non-limiting example, the servers 380 can be webservers configured to host websites that can be searched via one or more search engines and/or APIs using one or more queries generated by the coarse and fine harvesting engines of the engine 100. At least one of the websites hosted by at least one of the servers can utilize a tree or catalogue structure for its webpages. For example, at least one of the data sources 350, 360, and/or 370 can provide an online marketplace website, where the online marketplace user the tree or catalogue structure as described herein.

The databases 330 can store information for use by the engine 100. For example, the databases 330 can store queries, coarse data sets, fine data sets, extracted attributes from coarse and fine data sets by the extraction, tags associated with the coarse and fine harvesting engines, and/or any other suitable information/data that can be used by embodiments of the engine 100, as described herein.

FIGS. 4-10 illustrate exemplary graphical user interfaces for facilitating the detection, monitoring, assessing, and facilitation of remediation of malignant content from a networked environments (e.g., the Internet). The graphical user interfaces can be generated by embodiments of the malignant content detection and monitoring engine 100 being executed by one or more local servers and/or one or more user computing devices. The graphical user interfaces can be configured to render the attributes extracted from content (e.g., Internet content) as described herein and can be stored in records of the attribute database 135 as described herein, where a record is created for each result (e.g., webpage) resulting from a search of the content. The graphical user interfaces can provide an interface through which users can interact with the attributes extracted from the content. For example, the graphical user interfaces can be configured to provide a structured arrangement of the attributes extracted from a webpage collected via the coarse and fine harvesting engines. As a non-limiting example, the graphical user interfaces can provide a list or table including an entry or row for records in the attribute database 135 and can populate the entry or row for a record with the attributes associated with the record. As another non-limiting example, the graphical user interfaces can provide a two dimensional array or tiled arrangement including areas or tiles for records in the attribute database 135 and can populate each area or tile with the attributes associated with the records corresponding to the area or tile.

Figure 4:
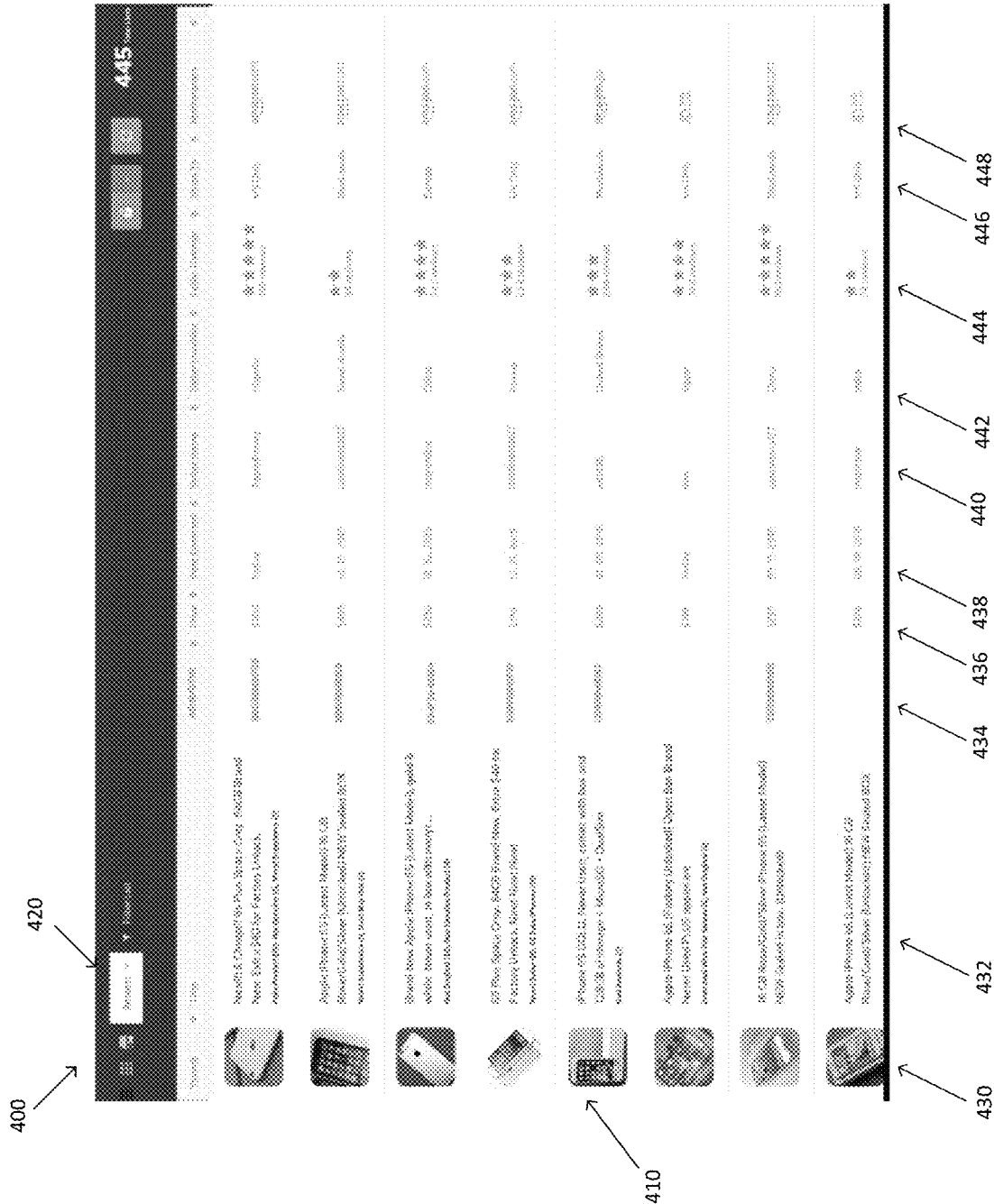
FIG. 4 depicts a graphical user interface including a list of record for webpages collected via a coarse harvesting engine of an embodiment of the malignant content detection and monitoring engine in accordance with the present disclosure.

FIG. 4 depicts a graphical user interface 400 including a list 410 of entries for webpages collected via the coarse harvesting engine of an embodiment of the malignant content detection and monitoring engine. For example, the rows can be associated with records in the attribute database corresponding to webpages. As shown in FIG. 4, the graphical user interface 400 can include a filter 420 that allows a user to render subsets of the webpages based on one or more filtering criteria. For example, the filter 420 can allow the user to filter the records based on a data source for the webpages, a data channel associated with the webpages, a country within which a webserver host the webpages, and the like. In the present example, the filter 420 is applied to render a subset of records for webpages that have been identified via the coarse harvesting engine as being associated with an online marketplace (e.g., Amazon).

Each row in the list can include attributes extracted from a webpage (e.g., a product page) that has been identified via the coarse harvesting engine as being associated with an online marketplace (e.g., Amazon) and each column can include a type of attribute extracted from a webpage that has been identified via the coarse harvesting engine as being associated with an online marketplace. For example, the attribute types for the columns can include an image 430 extracted from the webpages (e.g., an image of the product), a title 432 extracted from the webpage, an identifier 434 assigned to the product presented on the webpage, a price 436 for the product presented on the webpage, a detection date 438 indicating when the webpage was harvested by an embodiment of the malignant content detection and monitoring engine, an entity name 440 associated with the entity selling the product via the webpage, a geographic location 442 associated with the entity selling the product via the webpage, a rating 444 associated with the entity selling the product via the webpage, a geographic location 446 to which the seller will ship the product presented on the webpage, and a domain/marketplace name 448 that is hosting the webpage. The rows and/or the key attributes in the rows can be selectable by a user to allow the user to interact with the list 410 to modify the key attributes and/or to perform one or more other actions, such as tagging the rows (and thereby the records in the attributed database associated with the webpages) with one or more tags (e.g., benign, infringing, counterfeit, further review, etc.).

Figure 5:
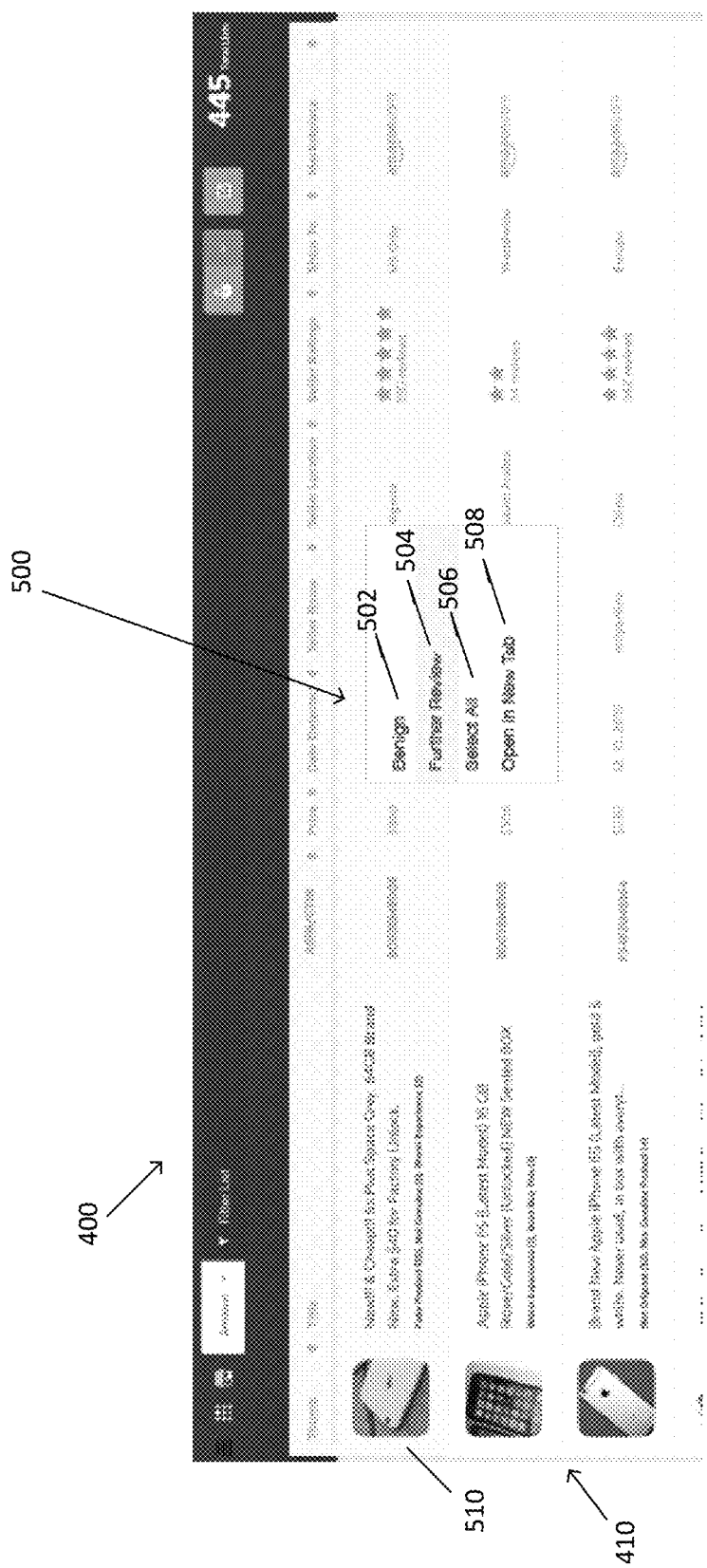
FIG. 5 depicts a drop down menu in response to a selection of a row in the list of the graphical user interface shown in FIG. 4.

FIG. 5 depicts a drop down menu 500 in response to a selection of a row 510 in the list 410 of the graphical user interface 400. As shown in FIG. 5, the dropdown menu 500 can include benign tag option 502 that can be associated with the record in row 510, and can include other options, such as a further review option 504, a select all option 506, and a open in new tab option 508. The benign tag option 502 can be selected to call the tagging engine to add a benign tag to the selected record to indicate that the record (and therefore its associated webpage) corresponds to benign content. The further review option 504 can be selected to generate a graphical user interface that allows the user to specify certain parameters and other tags for the selected record. The select all option 506 can cause the graphical user interface 400 to select all of the rows being displayed to facilitate bulk tagging. The open in new tab option 508 can be selected to cause the user interface to generate another window within which the record can be display and/or can cause the user interface to open a web browser tab and navigate to the webpage corresponding the selected record in the list 410.

Figure 6:
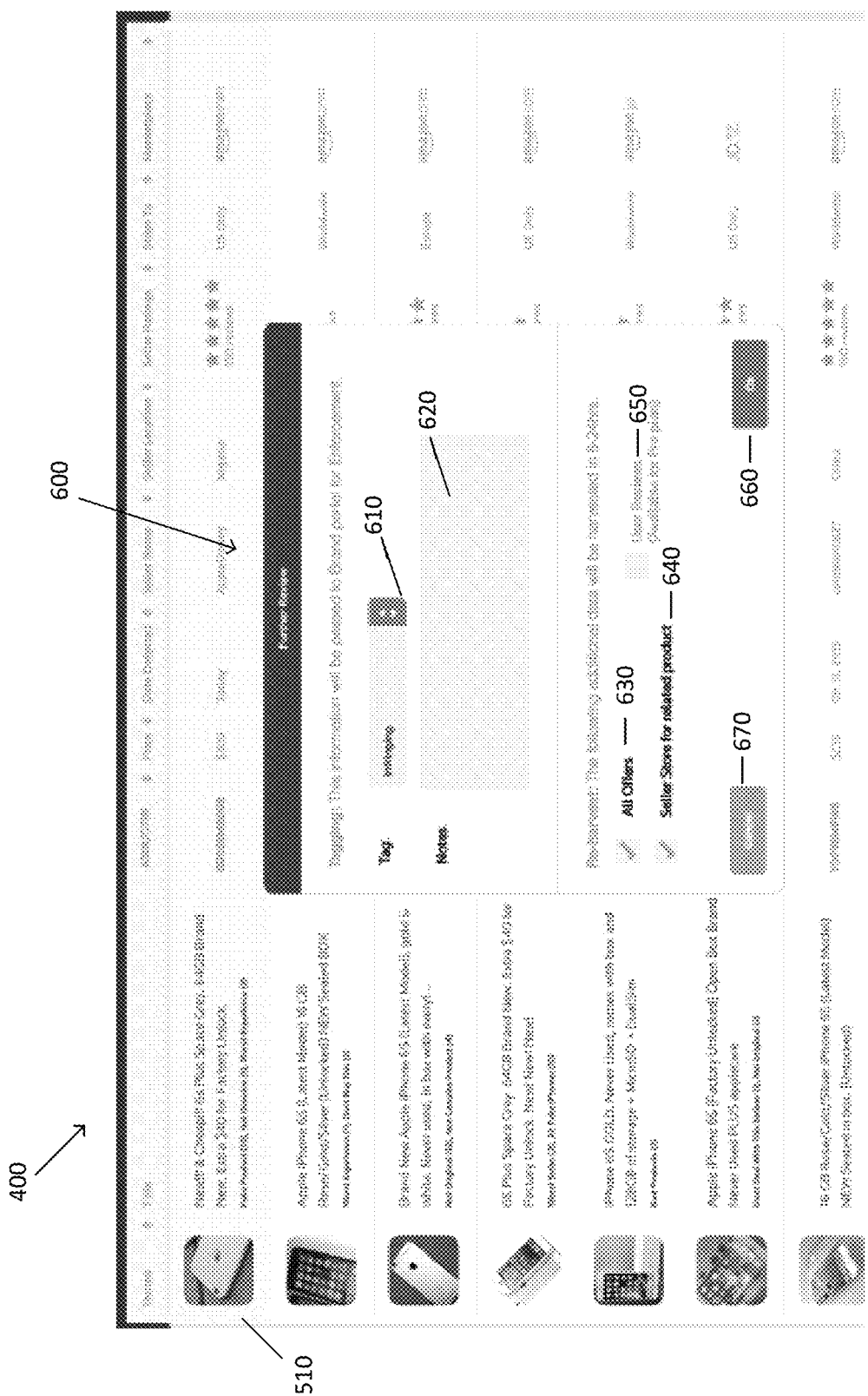
FIG. 6 depicts a graphical user interface that can be displayed in response to selection of a further review option by a user in the dropdown menu shown in FIG. 5 in accordance with embodiments of the present disclosure.

FIG. 6 depicts a graphical user interface 600 that can be displayed in response to selection of the further review option by the user in the dropdown menu (e.g., dropdown menu 500 shown in FIG. 5). As shown in FIG. 6, the graphical user interface 600 can include a tagging options 610 for the selected record (e.g., row 510), a data entry field 620 within which the user can add notes, and re-harvesting options. The tagging options 610 can include infringing, counterfeit, malicious, and the like, and can be selected to call the tagging engine to add a malignant tag (e.g., an infringing tag, a counterfeit tag, a malicious tag) to the selected record to indicate that the record (and therefore its associated webpage) corresponds to malignant content. The re-harvesting options can include an all offers option 620, a seller store for related product option 640, and a user reviews option 650. When the all offers option 620 is selected for a record associated with a product webpage from an online marketplace website that uses a tree or catalogue structure, the fine or micro-harvesting engine can be configured to generate specific URLs to search webpages related to the product page to identify other sellers offer the product via the online marketplace. When the seller store for related products option 640 is selected, the fine harvesting engine can be configured to generate specific URLs to search webpages of the marketplace website related to other products available from the seller identified in the selected record. When the user reviews option 650 is selected, the fine harvesting engine can be configured to generate specific URLs to search webpages of the marketplace website related to reviews of the seller associated with the record. The user can submit the entries in the graphical user interface 600 by selecting the "Ok" button 660 or can revert back to the previous values for the entries by selecting the "Cancel" button 670. In response to selecting the Ok button 660, the fine harvesting engine can be configured based on the selected parameters and can be automatically trigger to facilitate one or more search based on one or more attributes of the selected record.

Figure 7:
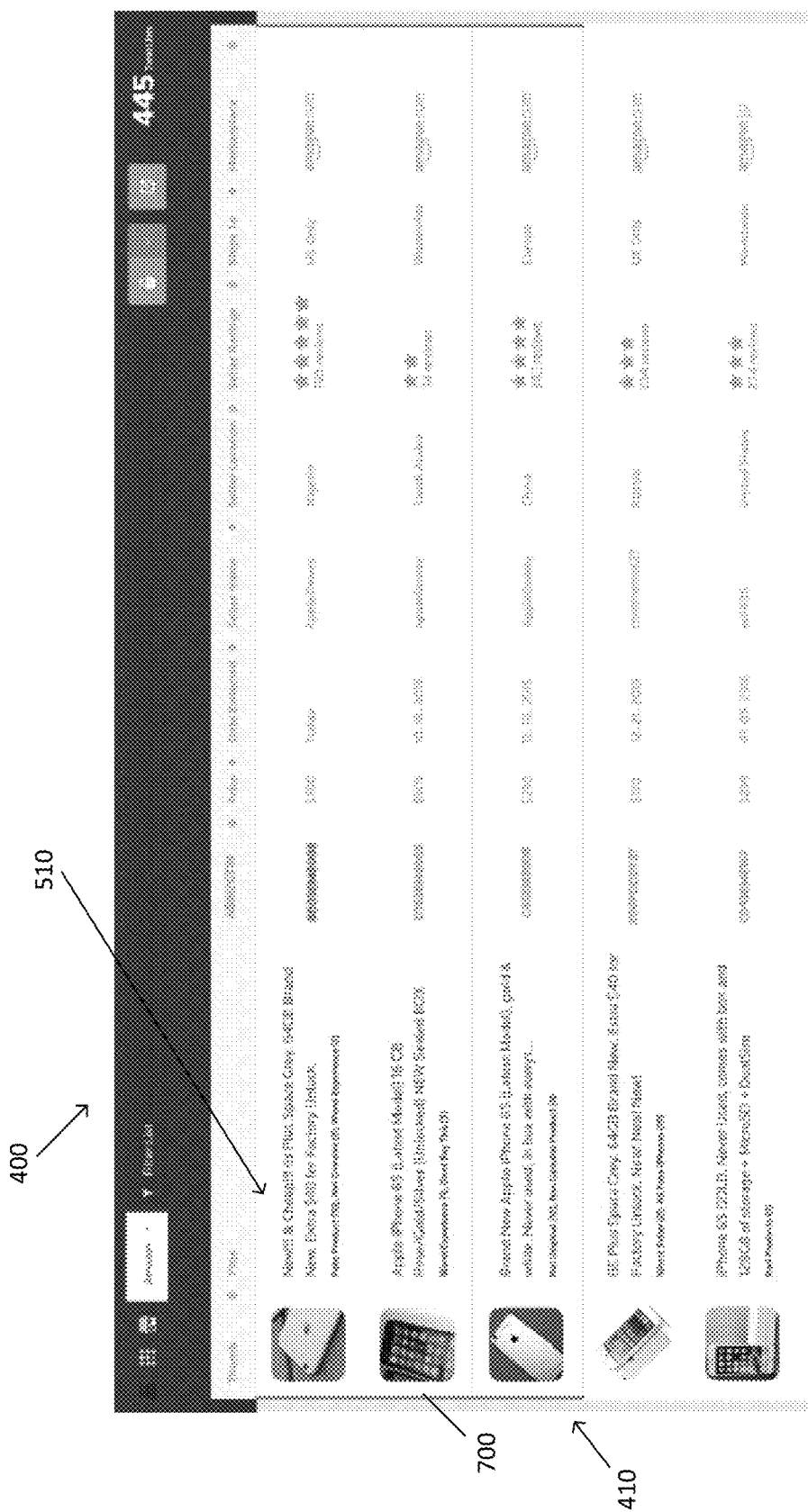
FIG. 7 depicts the graphical user interface shown in FIG. 4 after an embodiment of the malignant content detection and monitoring engine automatically performs a fine or micro-search in response to a user tagging one or more of the rows in the list as corresponding to malignant content in accordance with embodiments of the present disclosure.

FIG. 7 depicts the graphical user interface 400 after an embodiment of the malignant content detection and monitoring engine automatically performs a second (fine/micro) search in response to the user tagging one or more of the rows in the list 410 as corresponding to malignant content. For example, in response to the selection of the "Ok" button 660 in the graphical user interface 600 shown in FIG. 6, the fine harvesting engine of an embodiment of the malignant content detection and monitoring engine can be automatically triggered to harvest additional Internet content associated with the webpage associated with the row(s) that were tagged as corresponding to malignant content. After the attributes are extracted from the additional webpages, the graphical user interface automatically updates to include an indicator 700 (shown as lines running down the left and/or right side of the list 410. In exemplary embodiments, the indictor can be one or more colors (e.g., red) and can alert the user that addition content has been retrieved that is related to certain entries in the list 410 and that has not been tagged. In the present example, the indicator 700 can correspond to rows 510, 710, and 720 to indicate that additional Internet content has been added for the rows 510, 710, and 720. The user can select the 510, 710, and/or 720 to reveal the additional content.

Figure 8:
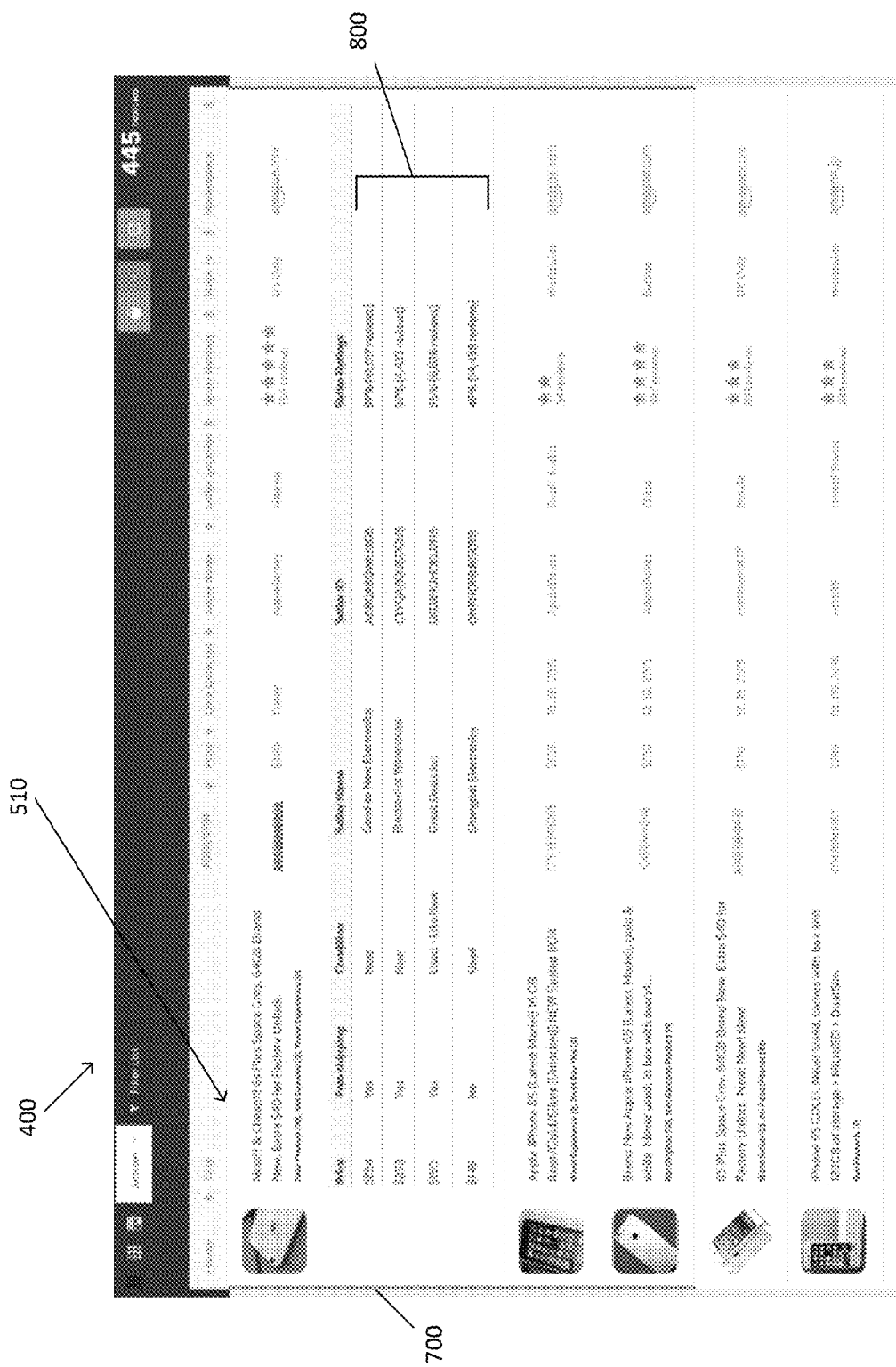
FIG. 8 depicts the graphical user interface revealing additional records identified via a search implemented by a fine or micro-harvesting engine in accordance with embodiments of the present disclosure.

FIG. 8 depicts the graphical user interface 400 revealing the additional content being indicated by the indicator 700 after selection of the row 510. For example, when the row 510 corresponding to a record in the attribute database is selected, additional records 800 can be revealed that are related to the original record associated with the row 510. The additional records can correspond to one or more webpages searched via the fine harvesting engine based on the attributes of the original record. As one example, when the original record correspond to a webpage (e.g., a product page) in a website that uses a tree or catalogue structure, the additional records can correspond to webpages (e.g., webpage(s) including a list of sellers offering the product, webpage(s) listing other products being offered by the seller associated with the product webpage) that are related to the webpage. Grouping the records in this manner allows the user to quickly review and assess whether there may be additional malignant content in the other records and to view a corpus of content associated with a specific attributes that may be of interest to the user.

Figure 9:
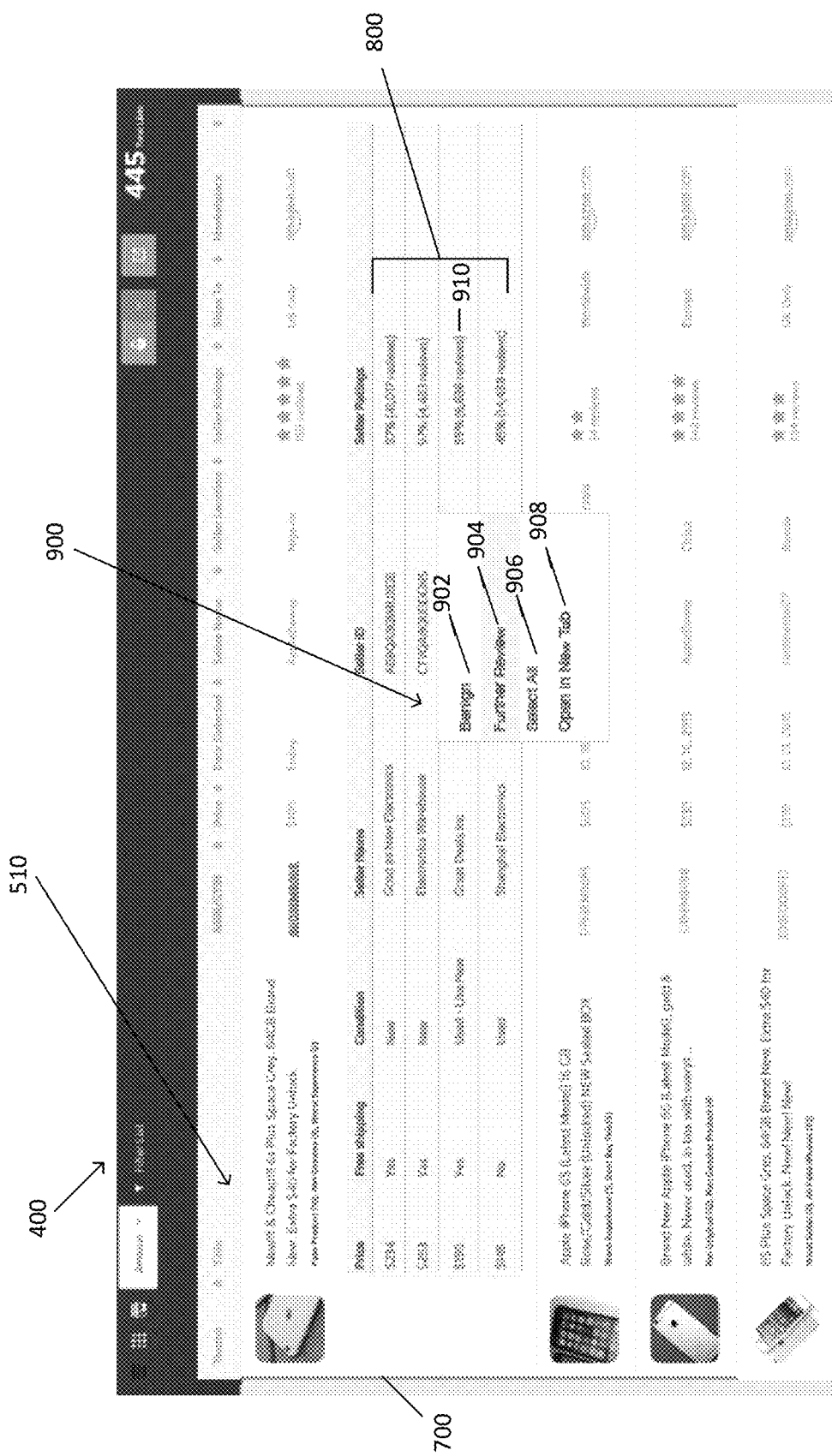
FIG. 9 depicts a drop down menu that can be displayed in response to a selection of a record from additional records identified via a search implemented by the fine harvesting engine and revealed in accordance with embodiments of the present disclosure.

FIG. 9 depicts a drop down menu 900 that can be displayed in response to a selection of a record 910 from the additional records 800 revealed for the row 510. As shown in FIG. 9, the drop down menu 900 can include benign tag option 902 that can be associated with the record 910, and can include other options, such as a further review option 904, a select all option 906, and a open in new tab option 908. The benign tag option 902 can be selected to call the tagging engine to add a benign tag to the selected record to indicate that the selected record, e.g., record 910 (and therefore its associated webpage) corresponds to benign content. The further review tag 904 can be selected to generate a graphical user interface that allows the user to specify certain parameters and other tags for the selected record. The select all option 906 can cause the graphical user interface 400 to select all of the rows being displayed to facilitate bulk tagging. The open in new tab option 908 can be selected to cause the user interface to generate another window within which the selected record, e.g., the record 910, can be display and/or can cause the user interface to open a web browser tab and navigate to the webpage corresponding the selected record.

Figure 10:
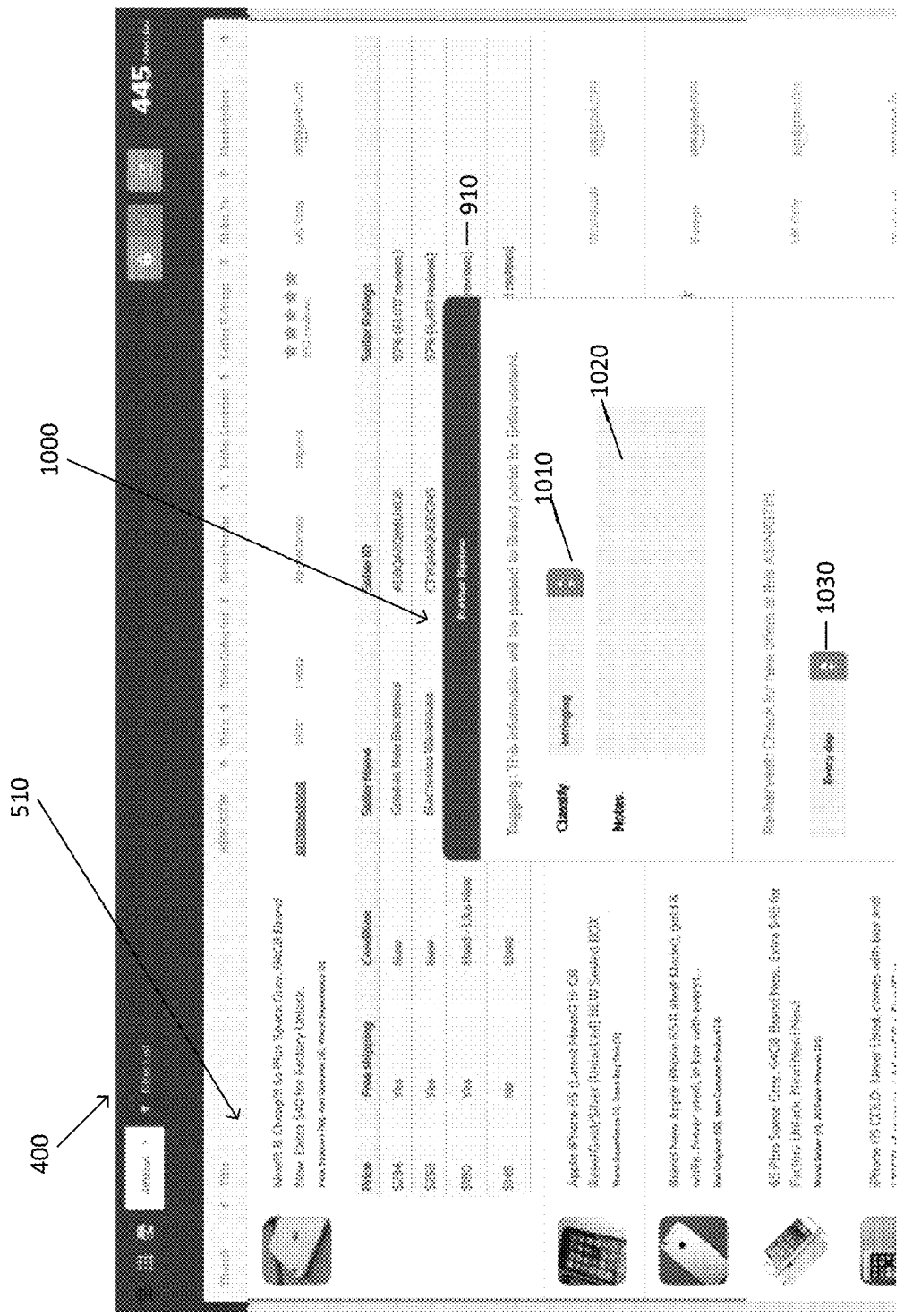
FIG. 10 depicts a graphical user interface that can be displayed in response to selection of the further review option by the user in the dropdown menu shown in FIG. 9.

FIG. 10 depicts a graphical user interface 1000 that can be displayed in response to selection of the further review option by the user in the dropdown menu (e.g., the dropdown menu 900 shown in FIG. 9). As shown in FIG. 10, the graphical user interface 1000 can include a tagging options 1010 for the selected record, e.g., the record 910, a data entry field 1020 within which the user can add notes, and reharvesting frequency option 1030. The tagging options 1010 can include malignant tagging options (e.g., infringing, counterfeit, malicious). The re-harvesting frequency option can allow the user to specify the frequency with which the fine harvesting engine re-queries the content in the networked environment using the URLs created by the fine harvesting engine and associated with the selected record. For example, the user can specify that the fine harvesting engine can repeat the fine search ever, hour, every day, every week, every month, quarterly, and like. The user can submit the parameters specified in the graphical user interface 1000 by selecting a "Ok" button or can revert back to the previous values for the parameter by selecting a "Cancel" button.

Figure 11:
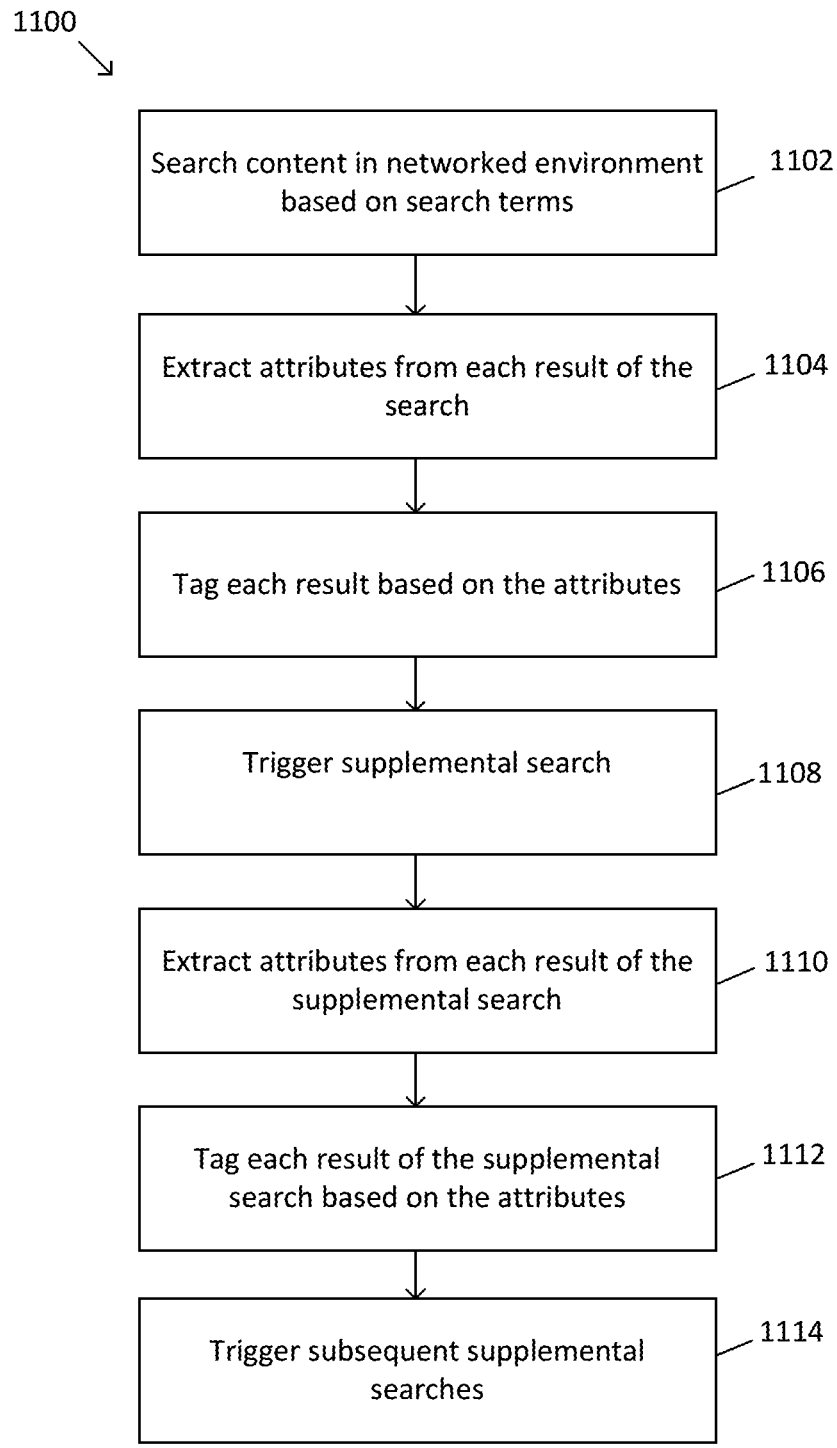
FIG. 11 is a flowchart illustrating an exemplary process for detecting, tracking, and monitoring malignant content in a networked environment in accordance with embodiments of the present disclosure.

FIG. 11 is a flowchart illustrating an exemplary process 1100 implemented in accordance with embodiments of the present disclosure. At step 1102, content (e.g., webpages) hosted by one or more remote servers in a networked environment is searched, e.g., via a coarse search implemented by one or more local servers in a computing system implementing an embodiment of the malignant content detection and monitoring engine 100 (FIG. 1). In exemplary embodiments the one or more remote servers can be webservers and the content hosted by the one or more servers can include websites that include webpages. At least one of the websites can utilize a tree or catalogue model to form the webpages. In exemplary embodiments, certain webpages in the website(s) that utilize the tree or catalogue-model are incapable of being search using search terms. One non-limiting example of a website that may implement a tree or catalogue model can be an online marketplace website.

The coarse search can be based on one or more search terms. For example, the one or more local servers executing an embodiment of the engine 100 can generate one or more queries based on the one or more search terms, and the one or more queries can form an input to at least one of a search engine or an application program interface for searching content hosted by the one or more remote servers. At step 1104, the one or more local servers extract attributes from each result (e.g., webpage) in a first set of results returned in response to searching the content hosted by the remote one or more servers, and at step 1106, each result is tagged based on the extracted attributes. In exemplary embodiments, the one or more local servers can create records in a database for the first set of results in response to extracting the attributes from the first set of results, where a record can be created for each result (e.g., webpage) in the first set of results. The attributes extracted from each result can be stored in their respective records.

A step 1108, the one or more local servers trigger a supplement search of the content (e.g., webpages) hosted by the one or more servers in the networked environment in response to at least one of the results from the coarse search being tagged as malignant content. For example, the one or more local servers executing an embodiment of the engine 100 can generate one or more uniform resource locators based on at least one of the attributes included in one or more of the results from the first set of results that have been tagged as malignant content, and can implement the search based on the one or more uniform resource locators. As one example, a uniform resource locator generated by the one or more local server can include a marketplace specific identifier with additional query syntax and can target specific webpages in a website (e.g., an online marketplace website).

At step 1110, the one or more local servers can extract the attributes from each supplement result in a second set of results returned in response to the supplemental search of the content hosted by the one or more servers, and at step 1112, each supplemental result is tagged based on the second plurality of attributes. In exemplary embodiments, the one or more local servers can create a record in the database for each result in the second set of results in response to extracting the attributes from the second set of results. The attributes extracted from each result in the second set of results can be stored in their respective records. At step 114, subsequent supplement searches of the content hosted by the one or more servers in the networked environment can be triggered in response to at least one of the supplemental results being tagged as malignant content.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The foregoing description of the specific embodiments of the subject matter disclosed herein has been presented for purposes of illustration and description and is not intended to limit the scope of the subject matter set forth herein. It is fully contemplated that other various embodiments, modifications and applications will become apparent to those of ordinary skill in the art from the foregoing description and accompanying drawings. Thus, such other embodiments, modifications, and applications are intended to fall within the scope of the following appended claims. Further, those of ordinary skill in the art will appreciate that the embodiments, modifications, and applications that have been described herein are in the context of particular environment, and the subject matter set forth herein is not limited thereto, but can be beneficially applied in any number of other manners, environments and purposes. Accordingly, the claims set forth below should be construed in view of the full breadth and spirit of the novel features and techniques as disclosed herein.

What is claimed is:

1. A method performed by a computing system for searching digital content in a networked environment to identify malignant content, the computing system comprising one or more local servers and a memory device storing instructions for the one or more local servers to perform the method comprising:

searching, by the one or more local servers, digital content hosted by one or more servers in a networked environment based on one or more keywords;

extracting, by the one or more local servers, a first plurality of attributes from each result in a first set of results returned in response to searching the digital content hosted by the one or more servers;

tagging, by the one or more local servers, each result based on the first plurality of attributes; and triggering, by the one or more local servers, a first supplement search of the digital content hosted by the one or more servers in response to at least one of the results being tagged as malignant content, wherein the first supplement search is triggered to generate uniform resource locators (URLs) and search for a second set of results related to the at least one of the results tagged as the malignant content based on the URLs.

2. The method of claim 1, further comprising:
generating one or more queries based on the one or more keywords,
wherein the one or more queries form an input to at least one of a search engine or an application program interface for searching digital content hosted by the one or more servers.

3. The method of claim 1, further comprising:
extracting a second plurality of attributes from each supplement result in the second set of results returned in response to the first supplemental search of the digital content hosted by the one or more servers; and
tagging each supplemental result based on the second plurality of attributes.

4. The method of claim 1, further comprising:
creating a first plurality of records in a database for the first set of results in response to extracting the first plurality of attributes from each result in the first set of results, each one of the first plurality of records created in the database corresponding to one of the results in the first set; and
storing the first plurality of attributes extracted from each result in a corresponding one of the first plurality of records created in the database.

5. A method performed by a computing system for searching content in a networked environment to identify malignant content, the computing system comprising one or more local servers and a memory device storing instructions for the one or more local servers to perform the method comprising:

searching, by the one or more local servers, content hosted by one or more servers in a networked environment based on one or more search terms;

extracting, by the one or more local servers, a first plurality of attributes from each result in a first set of results returned in response to searching the content hosted by the one or more servers;

tagging, by the one or more local servers, each result based on the first plurality of attributes; and triggering, by the one or more local servers, a first supplement search of the content hosted by the one or more servers in response to at least one of the results being tagged as malignant content;

creating, by the one or more local servers, a first plurality of records in a database for the first set of results in response to extracting the first plurality of attributes from each result in the first set of results, each one of the first plurality of records created in the database corresponding to one of the results in the first set;

storing, by the one or more local servers, the first plurality of attributes extracted from each result in a corresponding one of the first plurality of records created in the database;

extracting, by the one or more local servers, a second plurality of attributes from each supplement result in a second set of results returned in response to the first supplemental search of the content hosted by the one or more servers;

creating, by the one or more local servers, a second plurality of records in the database for the second set of results in response to extracting the second plurality of attributes from each supplemental result in the second set of results, each one of the second plurality of records created in the database corresponding to one of the supplemental results in the second set; and storing, by the one or more local servers, the second plurality of attributes extracted from each supplemental result in a corresponding one of the second plurality of records created in the database.

6. The method of claim 5, further comprising:
tagging each supplemental result based on the second plurality of attributes.

7. The method of claim 6, further comprising:
triggering a second supplement search of the content hosted by the one or more servers in the networked environment in response to at least one of the supplemental results being tagged as malignant content.

8. The method of claim 1, further comprising:
generating the URLs based on at least one of the first plurality of attributes included in the at least one of the results that has been tagged as malignant content.

9. The method of claim 1, wherein the one or more servers in the networked environment are webservers and the digital content hosted by the one or more servers is websites including webpages.

10. The method of claim 9, wherein at least one of the websites utilizes a tree structure in which at least some of the webpages are incapable of being found based on searches using search terms.

11. A system for searching digital content in a networked environment to identify malignant content, the system comprising:

a computing system communicatively coupled to data sources in a networked environment, the data sources including one or more remote servers that are configured to host digital content;

one or more local servers being disposed in the computing system; and a memory device being disposed in the computing system, the memory device storing instructions for the one or more local servers to:

search digital content hosted by the one or more remote servers in the networked environment based on one or more keywords;

extract a first plurality of attributes from each result in a first set of results returned in response to searching the digital content hosted by the one or more remote servers;

tag each result based on the first plurality of attributes; and trigger a first supplement search of the digital content hosted by the one or more remote servers in response to at least one of the results being tagged as malignant content, wherein the first supplement search is triggered to generate uniform resource locators (URLs) and search for a second set of results related to the at least one of the results tagged as the malignant content based on the URLs.

12. The system of claim 11, wherein the one or more local servers are further programmed to:

generate one or more queries based on the one or more keywords, wherein the one or more queries form an input to at least one of a search engine or an application program interface for searching digital content hosted by the one or more remote servers.

13. The system of claim 11, wherein the one or more local servers are programmed to:

extract a second plurality of attributes from each supplement result in the second set of results returned in response to the first supplemental search of the digital content hosted by the one or more remote servers; and tag each supplemental result based on the second plurality of attributes.

14. The system of claim 11, wherein the one or more local servers are programmed to:

create a first plurality of records in a database for the first set of results in response to extracting the first plurality of attributes from each result in the first set of results, each one of the first plurality of records created in the database corresponding to one of the results in the first set; and store the first plurality of attributes extracted from each result in a corresponding one of the first plurality of records created in the database.

15. A system for searching content in a networked environment to identify malignant content, the system comprising:

a computing system communicatively coupled to data sources in a networked environment, the data sources including one or more remote servers that are configured to host content;

one or more local servers being disposed in the computing system; and a memory device being disposed in the computing system, the memory device storing instructions for the one or more local servers to:

search content hosted by one or more remote servers in the networked environment based on one or more search terms;

extract a first plurality of attributes from each result in a first set of results returned in response to searching the content hosted by the one or more remote servers;

tag each result based on the first plurality of attributes;

trigger a first supplement search of the content hosted by the one or more remote servers in response to at least one of the results being tagged as malignant content;

create a first plurality of records in a database for the first set of results in response to extracting the first plurality of attributes from each result in the first set of results, each one of the first plurality of records created in the database corresponding to one of the results in the first set;

store the first plurality of attributes extracted from each result in a corresponding one of the first plurality of records created in the database;

extract a second plurality of attributes from each supplement result in a second set of results returned in response to the first supplemental search of the content hosted by the one or more remote servers;

create a second plurality of records in the database for the second set of results in response to extracting the second plurality of attributes from each supplemental result in the second set of results, each one of the second plurality of records created in the database corresponding to one of the supplemental results in the second set; and store the second plurality of attributes extracted from each supplemental result in a corresponding one of the second plurality of records created in the database.

16. The system of claim 15, wherein the one or more local servers are programmed to:

tag each supplemental result based on the second plurality of attributes.

17. The system of claim 16, wherein the one or more local servers are programmed to:

trigger a second supplement search of the content hosted by the one or more remote servers in the networked environment in response to at least one of the supplemental results being tagged as malignant content.

18. The system of claim 11, wherein the one or more local servers are programmed to:

generate the URLs based on at least one of the first plurality of attributes included in the at least one of the results that has been tagged as malignant content.

19. The system of claim 11, wherein the one or more remote servers in the networked environment are webservers and the digital content hosted by the one or more remote servers is websites including webpages.

20. The system of claim 19, wherein at least one of the websites utilizes a tree structure in which at least some of the webpages are incapable of being found based on searches using search terms.

* * * * *